United States Patent [19]
Wright

[11] 3,944,899
[45] Mar. 16, 1976

[54] CONTROL CIRCUIT FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,528

[30] Foreign Application Priority Data
June 30, 1973  United Kingdom............... 31303/73

[52] U.S. Cl. ................ 318/269; 318/139; 318/369
[51] Int. Cl.² ................................................ H02P 5/16
[58] Field of Search ................... 318/139, 269, 369

[56] References Cited
UNITED STATES PATENTS

| | | | |
|---|---|---|---|
| 3,100,554 | 8/1963 | Doubek | 318/269 X |
| 3,599,764 | 8/1971 | Daab | 318/302 X |
| 3,725,758 | 4/1973 | Loyk | 318/269 |
| 3,792,330 | 2/1974 | Ottoson | 318/269 |

*Primary Examiner*—Benjamin Dobeck
*Attorney, Agent, or Firm*—Holman & Stern

[57] ABSTRACT

In a control circuit for an electrically driven vehicle, there is an accelerator pedal which when depressed sets the armature current of a traction motor, and a brake pedal which when depressed provides electrical braking of the vehicle. The electrical braking is inhibited unless the vehicle speed is above a predetermined value.

4 Claims, 6 Drawing Figures

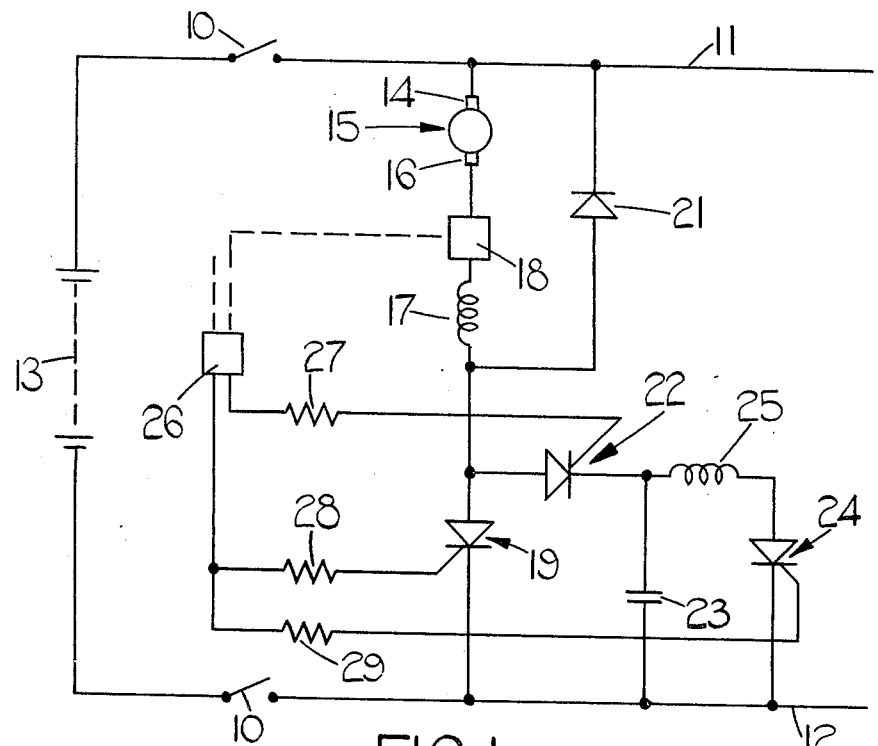
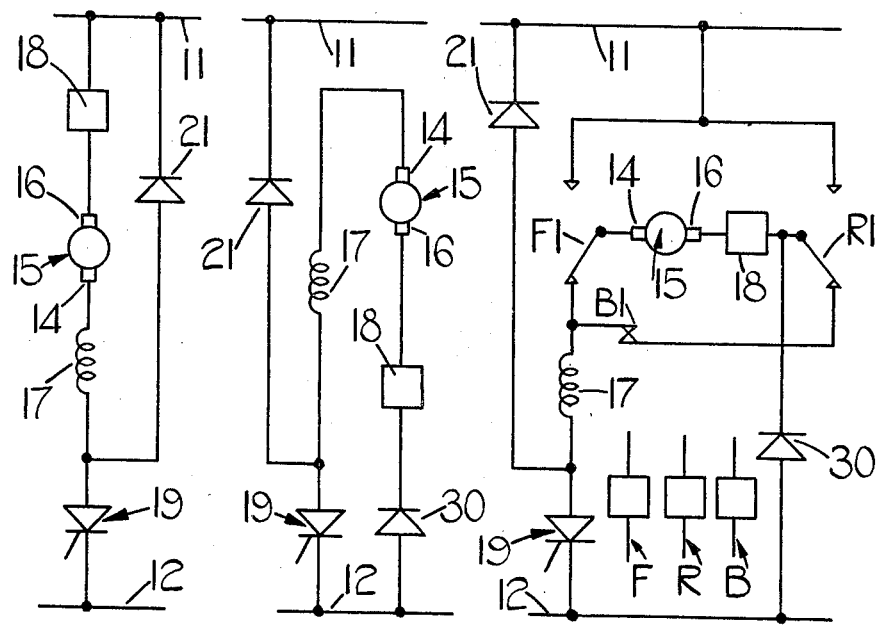
FIG.1.   FIG.2.   FIG.3.   FIG.4.

3,944,899

CONTROL CIRCUIT FOR ELECTRICALLY DRIVEN VEHICLES

This invention relates to control circuits for electrically driven vehicles.

SUMMARY OF THE INVENTION

A circuit in accordance with the invention comprises in combination a traction motor for driving the vehicle, an accelerator pedal which when depressed sets the armature current of the motor, a brake pedal which when depressed provides electrical braking of the vehicle, and means for preventing the brake pedal from providing electrical braking until the vehicle speed is above a predetermined value.

Preferably, means is provided for maintaining electrical braking, once it has commenced, when the vehicle speed falls below the predetermined value. This latter means can for example maintain electrical braking until the armature current drops to a set level.

In one arrangement, depression of the accelerator pedal inhibits the provision of electrical braking.

DESCRIPTION OF THE FIGURES

Two examples of the invention are illustrated in the accompanying drawings, in which FIGS. 1 and 3 are circuit diagrams of a control circuit for an electrically driven vehicle, showing the alternative connectors of the circuit, FIG. 4 illustrates one arrangement of contactors for producing the connections shown in FIGS. 1 to 3, and FIGS. 5 and 6 are circuit diagrams of the alternative control arrangements used in conjunction with FIGS. 1 to 4.

DISCUSSION OF THE PREFERRED EMBODIMENT

Figure 5:
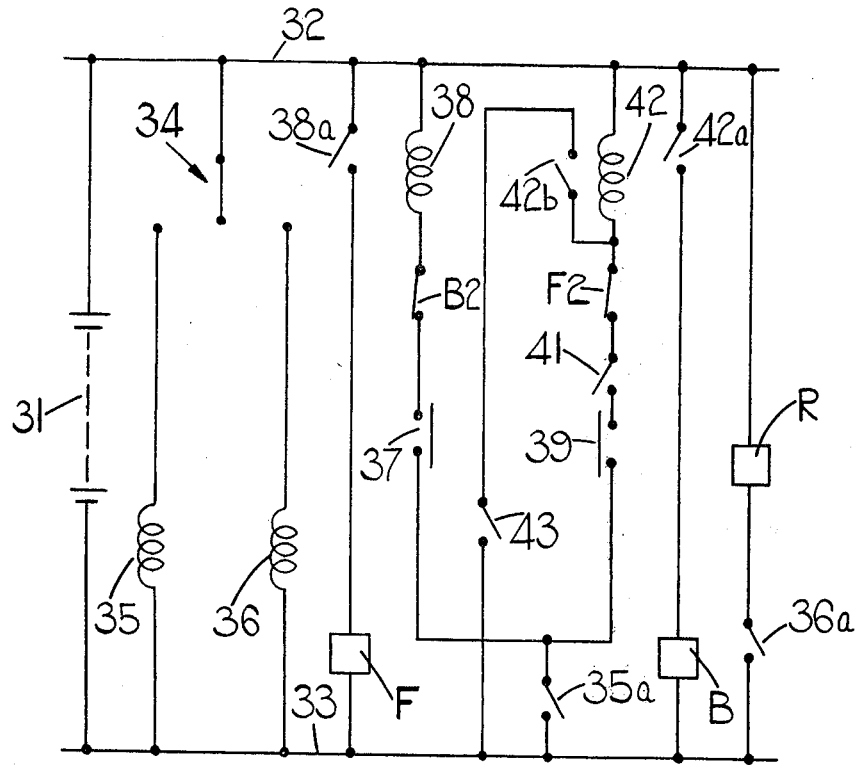

Referring first to FIG. 1, there are provided positive and negative supply lines 11, 12 connected through contacts 10 to the traction battery 13 of the vehicle. Typically, the battery 13 has a voltage in excess of 200 volts. Connected to the line 11 is one end 14 of the armature of a series wound traction motor 15, the other end 16 of the armature being connected to the line 12 through a series circuit including a current sensing device 18, the field winding 17 of the motor 15 and the anode-cathode path of a thyristor 19. The series combination of armature, device 18 and winding 17 is bridged by a freewheel diode 21, and the junction of the winding 17 and thyristor 19 is connected to the anode of a thyristor 22, the cathode of which is connected to the line 12 through a capacitor 23. The capacitor 23 is bridged by an inductor 25 and the anode-cathode path of a thyristor 24 in series. The thyristors 19 and 24 have their gates connected through resistors 28, and 29 respectively to one output terminal of a control unit 26, the unit 26 having a second output terminal which is connected through a resistor 27 to the gate of the tyristor 22.

FIG. 1 shows the circuit connections when the vehicle is being driven in a forward direction. The accelerator pedal of the vehicle operates a potentiometer which produces an output representing the demand current level in the motor. This output signal is converted to two signals representing an upper current level and a lower current level respectively, and these two signals are sensed by the control unit 26, which also receives a signal from the device 18. When the current flow in the motor reaches the upper level, the thyristor 19 is turned off, and when the current flow falls to the lower level, the thyristor 19 is turned on again. The operation of the circuit to control the thyristor 19 is best explained by commencing at a point in the cycle of operations when the thyristors 19 and 24 are off, and the thyristor 22 is conducting and charging the capacitor 23. When the capacitor 23 is charged, current flow through the thyristor 22 reduces to zero and so the thyristor 22 turns off. Since the thyristor 19 is not conducting, the current flow in the device 18 will be decreasing, and when the current reaches the lower level, the unit 26 produces an output to turn on the thyristor 19 and the thyristor 24. Conduction of the thyristor 24 causes the charge on the capacitor 23 to be reversed, after which the thyristor 24 turns off. The capacitor 23 is now charged with its lower plate positive and its upper plate negative. Conduction of the thyristor 19 causes current to flow in the armature 15 and the winding 17, and the current flowing in the device 18 now increases until it reaches the upper level. When this upper level is reached, the control unit 26 produces an output to turn on the thyristor 22, permitting discharge of the capacitor 23 with the result that the thyristor 19 is turned off. The capacitor 23 now charges again through the thyristor 22 and the cycle is repeated.

In the arrangement being described, it is also possible to use the motor to brake the vehicle electrically, and to use the motor to drive the vehicle in reverse. FIG. 1 does not show the various contactor arrangements which are used for this purpose, but FIGS. 2 and 3 show the circuit connections when these contactors are in the appropriate position. Thus, FIG. 2 shows the arrangement when the vehicle is to be driven in reverse. The circuit connections are the same as in FIG. 1, except that the end 16 of the motor 15 is now connected to the line 11 through the device 18 and the other end 14 is connected to the winding 17. The operation is exactly the same as in FIG. 1, except that the motor is driven in the reverse direction.

FIG. 3 shows the circuit connections when the motor is being used to brake the vehicle electrically. The end 14 of the motor is connected to the winding 17 as in FIG. 2, but the end 16 is now connected to the line 12 through the device 18 and an additional diode 30 in series. When the motor is being used to brake the vehicle, the potentiometer operated by the accelerator pedal is inoperative, but another potentiometer is operated by the brake pedal, and provides a signal to the unit 26 in exactly the same way as the potentiometer operated by the accelerator pedal. Thus, the current in the motor armature will be controlled in the same way as described with reference to FIG. 1. In this case, however, the motor 15 acts as a generator and charges the battery by way of the diodes 21 and 30.

There are various contactor arrangements that can be used to produce the arrangements shown in FIGS. 1 to 3, but one possible arrangement is shown in FIG. 4. The basic controls of the vehicle are the accelerator pedal, which when depressed operates a potentiometer as previously explained, the brake pedal which operates another potentiometer and also provides normal hydraulic braking for the vehicle, and a selector switch which has a central off position but is movable in opposite directions from the off position to select forward or reverse movement of the vehicle. In FIG. 4 three contactor operating devices F, R, B are shown. If the selector switch is in the forward position and the accelerator pedal is depressed, the device F will be energised and will operate a contact F1 which normally occupies the position shown in the drawing but when the device F is energised moves to its alternative position in which it connects the circuit in the manner indicated in FIG. 1. If, on the other hand, the selector switch is moved to its reverse position and the accelerator pedal is depressed, then the device R is energised and a contact R1 is moved from the position shown to its alternative position, at which point the circuit is in the form indicated in FIG. 2.

If the selector switch is in its forward position, but the brake pedal is depressed, then normal hydraulic braking is provided, but in addition the device B is energised to open the contact B1. The contacts F1 and R1 will be in the positions shown, and so it will be seen that the circuit now has the form shown in FIG. 3, so that electrical braking is provided as explained above.

Although the arrangements shown in FIGS. 1 to 4 relate to a series motor, they can also be applied to shunt and compound motors. In this case, the arrangements described will control the armature current.

Referring now to FIG. 5, in addition to the traction battery, the vehicle incorporates a 24 volt battery 31 providing power to positive and negative supply lines 32, 33. The selector switch previously referred to is shown at 34, and is movable from its central off position to a forward position in which it energises a relay winding 35, or a reverse position in which it energises a relay winding 36. The windings 35 and 36 serve when energise to close normally open contacts 35a and 36a respectively, and various control and safety arrangements may be provided between the windings 35, 36 and the contacts 35'a, 36a. However, for the purposes of the present example it can be assumed that energisation of one of the windings 35, 36 ultimately closes the appropriate contact 35a or 36a.

The contact 35a is connected between the lines 33, 32 in a series circuit including a switch 37, a contact B2 and a relay winding 38. The contact 35a is also connected in a circuit between the lines 33, 32 including a switch 39, a switch 41, a contact F2 and a relay winding 42. The relay winding 38 when energised closes a normally open contact 38a connected in series with the device F shown in FIG. 4 between the lines 32 and 33, and the relay winding 42 serves when it is energised to close two contacts 42a and 42b, the contact 42a being connected in series with the device B between the lines 32, 33. The contact 42b is connected in series with a switch 43 between the junction of the winding 42 and contact F2 and the line 33. Moreover the contact 36a when closed completes a circuit between the lines 33, 32 by way of the device R.

The switches 37 and 39 are normally open switches controlled by the accelerator and brake pedals of the vehicle respectively, and close when the accelerator and brake pedals respectively are depressed. The contacts B2 and F2 are opened when devices B and F are energised respectively, the switch 41 is sensitive to the speed of the vehicle and is closed whenever the vehicle speed is in excess of a predetermined value, typically 4 m.p.h. The switch 43 is responsive to the current flowing in the motor armature, and is closed whenever the current is above a predetermined low level, typically 30 amps.

Assuming that the switch 34 is moved to the forward position, then the contact 35a closes. If the accelerator pedal is now depressed, the switch 37 closes to energise the relay winding 38 and close the contact 38a, so that the device F is energised. The contact F2 opens to prevent energisation of the relay winding 42. If the switch 34 is moved to the reverse position, then the relay winding 36 is energised and the device R is energised so that the vehicle is driven in the reverse direction.

If the switch 34 is in the forward position, and the driver removes his foot from the accelerator pedal and places his foot on the brake pedal, then the switch 37 will open to de-energise the winding 38 and so de-energise the device F, and the switch 39 will close. De-energisation of the device F causes the contact F2 to close, and so provided that the vehicle speed is in excess of 4 m.p.h., so that the switch 41 is closed, the relay winding 42 will be energised to close the contact 42a and energise the deive B. If the vehicle speed is not above 4 m.p.h., then the switch 41 is open and electrical braking will not be provided.

Once the device B has been energised to provide electrical braking, then assuming that the armature current is above 30 amps, the winding 42 is held on by current flowing through the switch 43 and contact 42b. As the speed of the vehicle reduces, then even if the speed falls below 4 m.p.h. so that the switch 41 opens, electrical braking will still be provided until the armature current drops below 30 amps, at which point the switch 43 opens to de-energise the winding 42.

If the driver presses both the accelerator pedal and the brake pedal at a low vehicle speed, electrical braking will not be provided because the switch 41 will be open.

Figure 6:
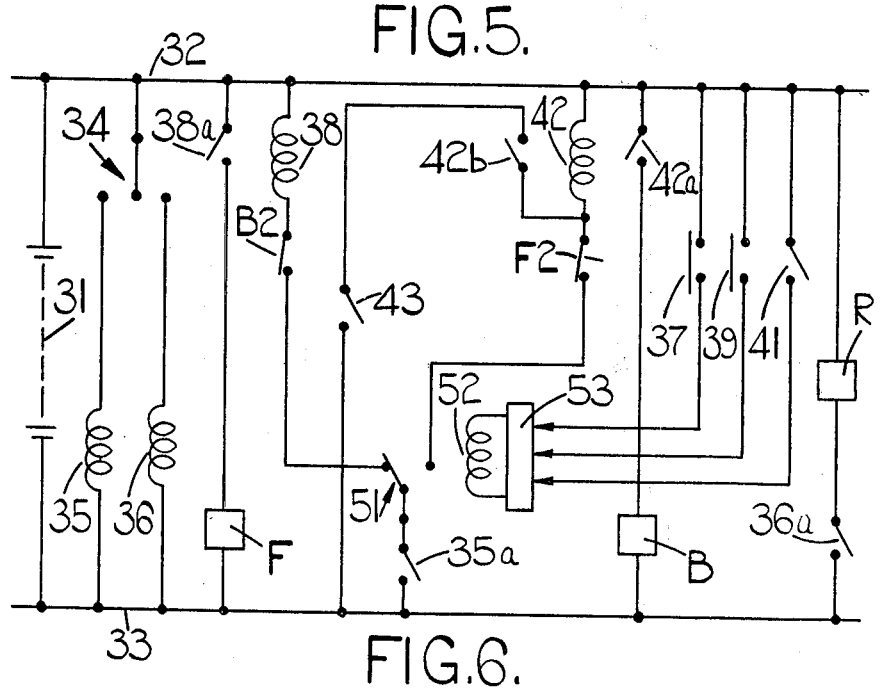

Referring now to FIG. 6, the switches 37, 39 and 41 now provide three inputs to an AND gate 53 which when it receives all three inputs energises a winding 52. The winding 52 controls a switch 51 which normally occupies the position shown in which it completes a circuit to the winding 38 when the switch 35a is closed. However, when the AND gate operates, the switch 51 is moved to its alternative position in which it energises the winding 42 if the contact 35a is closed. It should be noted that in this example the switch 37 is normally closed.

In this example, if the switch 34 is in its forward position, then the device B can only be energised if three conditions are fulfilled. The accelerator pedal must be released, so that the switch 37 is closed. The brake pedal must be depressed so that the switch 39 is closed, and the vehicle speed must be in excess of 4 m.p.h., so that the switch 41 is closed. Only if these three conditions are fulfilled is the switch 51 moved to its alternative position to energise the winding 42. Once the winding 42 has been energised, it remains energised by way of the switch 43 as in FIG. 5.

It will be appreciated that using the arrangement shown in FIG. 6 once electrical braking has commenced it will continue until the armature current falls to 30 amps, as in FIG. 5. However, in FIG. 6 if the accelerator is depressed at any time when the device B is not energised, then it is not possible for the device B to be energised until the accelerator pedal is released, and of course the brake pedal is depressed and the vehicle speed is above 4 m.p.h. It will be appreciated that in FIG. 5, the devices F and B are de-energised when neither pedal is depressed. In FIG. 6, the device F is energised if neither pedal is depressed, so that the system is maintained in a forward drive condition, so that when the accelerator pedal is depressed, the circuit will act quickly. This arrangement is particularly advantageous at low speeds, say below 4 m.p.h., because the contactors do not have to keep opening and closing as the accelerator and brake pedal are depressed and released.

In both FIG. 5 and FIG. 6 the relay 38 may have a hold-on contact providing a hold by way of contact 43 above 30 amps.

I claim:

1. A control circuit for an electrically driven vehicle comprising in combination: A traction motor; an accelerator pedal; means sensitive to the position of the accelerator pedal for controlling the forward drive current to the motor; a brake pedal; braking means operable on actuation of the brake pedal for connecting the motor to provide controlled electrical braking of the vehicle; inhibiting means sensitive to the speed of the vehicle and inhibiting initiation of operation of said braking means when the brake pedal is actuated while the vehicle speed is below a predetermined value; and means for maintaining electrical braking, once commenced, after the vehicle speed falls below the predetermined level.

2. A circuit as claimed in claim 1 in which the means for maintaining electrical braking operates until the armature current drops to a set level.

3. A circuit as claimed in claim 1 in which depression of the accelerator pedal inhibits the provision of electrical braking.

4. A circuit as claimed in claim 1, including means whereby when neither pedal is depressed, the circuit behaves as if the accelerator pedal is depressed.

* * * * *